United States Patent [19]

Crosby et al.

[11] 4,447,803

[45] May 8, 1984

[54] OFFSET DIGITAL DITHER GENERATOR

[75] Inventors: Philip S. Crosby, Portland; Dale A. Jordan, Aloha, both of Oreg.

[73] Assignee: Tektronix, Inv., Beaverton, Oreg.

[21] Appl. No.: 110,566

[22] Filed: Jan. 9, 1980

[51] Int. Cl.³ .......................................... H03K 13/02
[52] U.S. Cl. ..................... 340/347 CC; 340/347 AD; 340/347 M
[58] Field of Search ... 340/347 M, 347 AD, 347 DA, 340/347 CC; 358/167

[56] References Cited

U.S. PATENT DOCUMENTS

| | | | |
|---|---|---|---|
| 3,244,808 | 4/1966 | Roberts | 358/133 |
| 3,484,778 | 12/1969 | Brahm | 340/347 DA |
| 3,560,957 | 2/1971 | Miura et al. | 340/347 M X |
| 3,562,420 | 2/1971 | Thompson | 358/167 X |
| 3,656,152 | 4/1972 | Gundersen | 340/347 DA X |
| 3,701,974 | 10/1972 | Russell | 340/347 DA X |
| 3,836,908 | 9/1974 | Hegendorfer | 340/347 DA |
| 3,877,022 | 4/1975 | Lehman et al. | 340/347 AD |
| 3,879,724 | 4/1975 | McDonald | 340/347 AD |
| 4,187,466 | 2/1980 | Kasson et al. | 340/347 AD X |
| 4,283,713 | 8/1981 | Philipp | 340/347 SH |

OTHER PUBLICATIONS

Burton, MEASURING A/D CONVERTER LINEARITY . . . , Analog Dialogue, 13-2, 1979..
The Engineering Staff of Analog Devices, Inc., ANALOG-DIGITAL CONVERSION HANDBOOK 6/72, p. II-89 to II-129.
Federal Scientific Corpration, DITHERING INCREASES SYNAMIC RANGE ADN IMPROVES LINEARITY, 8/73, PP. 1-8.

Primary Examiner—T. J. Sloyan

[57] ABSTRACT

A digital dither generator is described which produces a series of discrete analog values which remain constant for each repetition of a signal being digitized. These analog values are summed with the analog input value being digitized. The dither states exhibit two useful characteristics; a bit-reversal scheme in which a sequence of dither values is used to progressively maximize the resolution of the digitizer and a technique of offsetting the values by a known amount to statistically improve digitizer accuracy.

7 Claims, 1 Drawing Figure

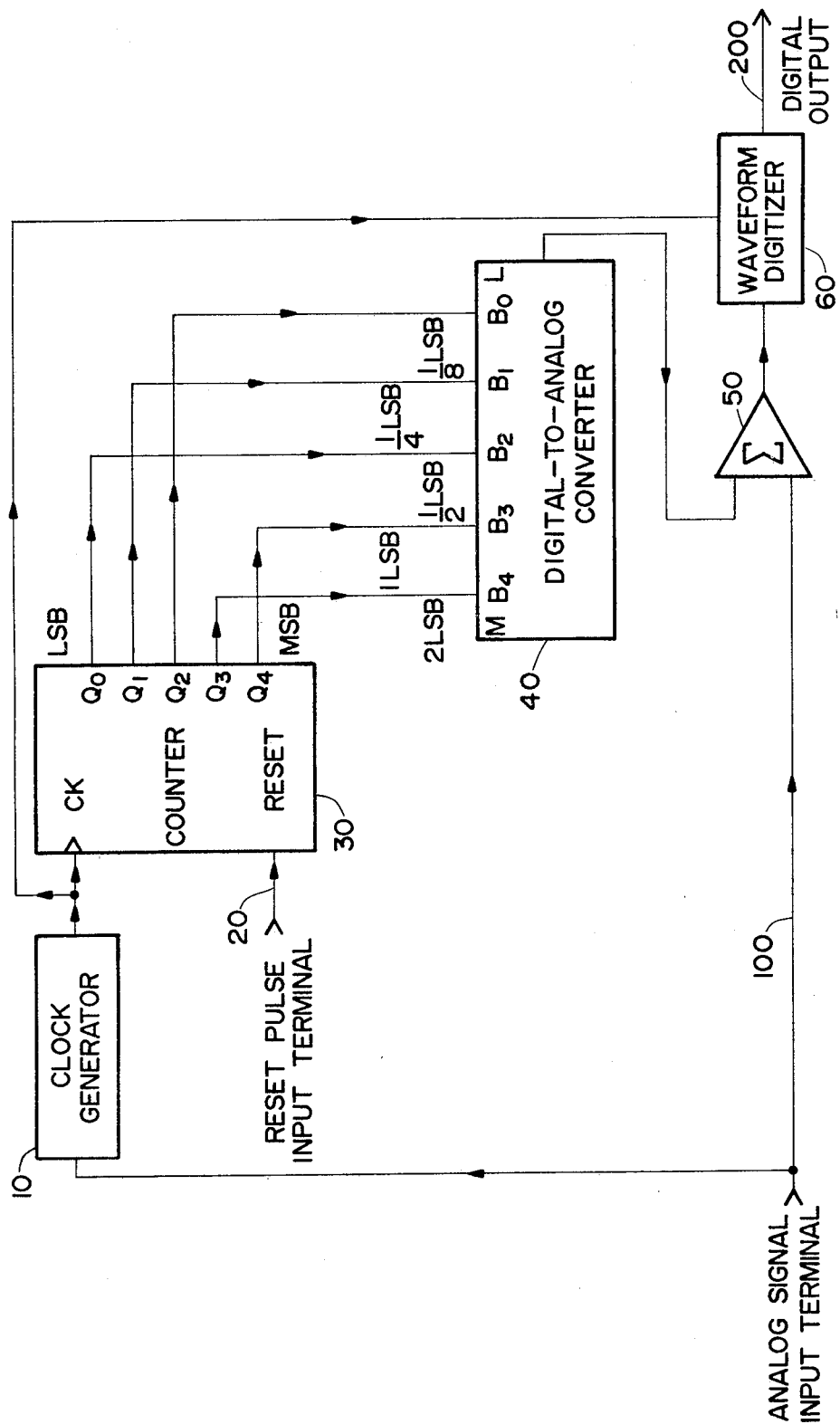

OFFSET DIGITAL DITHER GENERATOR

BACKGROUND OF THE INVENTION

The present invention relates to the field of analog-to-digital converters and more specifically to an apparatus and method for improving the accuracy and resolution of a digitizer.

During the process of converting analog signals to digital signals certain errors are introduced into the digital output signal. Typical sources of error are the well-known offset errors, scale factor errors, linearity errors and non-monotonicity. Another source of error is inherent in the quantization process itself.

Known as quantization or uncertainity error, this error occurs when a continuous signal is impressed on a quantizing device. The continuous signal is quantized by partitioning it into discrete ranges. All analog values within a given range are represented by the same digital code, which corresponds to a nominal mid-range analog input value.

A cut-point, designated as n, is defined as the analog input voltage at which it is equally probable that the digital output code will be n or n+1. There is, therefore, an inherent quantization error of $\pm\frac{1}{2}$ least significant bit (LSB) present in the analog-to-digital conversion process. Previous methods of reducing this error voltage include increasing the number of bits in the output code.

SUMMARY OF THE INVENTION

According to the present invention, a digital dither generator produces a sequence of "dither states". This sequence of dither states is converted to analog voltages which are summed with an input analog signal before it is converted to digital form by a quantizer. The dither states have two unique characteristics. The first is a bit-reversal scheme in which the same sequence of dither states is used to progressively maximize the resolution of the quantizer. The second is the inclusion of a dither component that is an equal to the analog equivalent of an integer number of LSB's to statistically improve the accuracy of the quantizer.

It is therefore an object of the present invention to provide a means for improving the accuracy of a quantizer.

It is another object of the present invention to provide a means for improving the resolution of a quantizer.

The invention both as to organization and method of operation together with further advantages and objects thereof may best be understood by way of reference to the following description taken in conjunction with the accompanying drawing. It is to be understood, however, that the embodiment described is not intended to limit the invention but is for purposes of illustration in order that others skilled in the art may fully understood it and the principles thereof and the manner of applying it in particular use so that they modify it in various forms.

BRIEF DESCRIPTION OF THE DRAWING

The single drawing FIGURE shows a block diagram of a circuit arrangement for improving the accuracy and resolution of a digitizer according to the present invention.

DETAILED DESCRIPTION OF THE PREFERRED EMBODIMENT

Referring now to the drawing FIGURE, therein is illustrated a block diagram of a circuit arrangement according to the present invention.

The analog signal which is to be digitized enters the system on input line 100 and is coupled to summing amplifier 50. The input signal is also connected to a clock generator 10 which generates a clock pulse at the end of each repetition period of the input signal. The output of clock generator 10 is connected to the clock (CK) input of counter 30.

Counter 30 also receives a reset pulse on input line 20. The reset pulse is coupled to the reset input of counter 30 to initialize the system. The reset pulse may be generated by an event external to the digitizing system, such as a power-on sequence. Counter 30 may be a conventional binary output counter. A 5-bit counter is shown for purposes of illustration only. In the illustrated circuit, the $Q_o$ output is the LSB while the $Q_4$ output is the most significant bit (MSB) of the counter output word.

The outputs of counter 30 are directly connected to the data inputs of digital-to-analog converter (DAC) 40. DAC 40 may be any commercially available DAC, the number of input bits should, of course, correspond to the number of bits in the output word of counter 30. Consequently, a 5-bit DAC is illustrated. The output of DAC 40 is coupled to one input of a summing means 50, the other input of which receives the original analog input signal. Summing means 50 may comprise an operational amplifier, a resistive network, or the like.

The output of summing amplifier 50 is coupled to the input of waveform digitizer 60. Waveform digitizer 60 may comprise any conventional waveform digitizer including a quantizer, a clock generator and suitable accumulators for accumulating successive samples of the quantized signal. For purposes of illustration an 8-bit quantizer is utilized in waveform digitizer 60. This quantizer exhibits the previously mentioned $\pm\frac{1}{2}$ LSB quantization error. The exemplary 8-bit quantizer has a full-scale input voltage of 10 volts. In such a quantizer the analog input equivalent to the LSB of the digital output word thereof is 39.1 millivolts.

The output lines of counter 30 are connected to inputs of DAC 40 in such a manner that DAC 40 produces output voltages according to following table:

| Counter State | DAC Output (Millivolts) |
|---|---|
| 00000 | 0 |
| 00001 | 19.5 - $\frac{1}{2}$ LSB |
| 00010 | 9.8 - $\frac{1}{4}$ LSB |
| 00011 | 29.3 - $\frac{3}{4}$ LSB |
| 00100 | 4.9 - $\frac{1}{8}$ LSB |
| 00101 | 24.4 - $\frac{5}{8}$ LSB |
| 00110 | 14.7 - $\frac{3}{8}$ LSB |
| 00111 | 33.6 - $\frac{7}{8}$ LSB |
| 01000 | 78.2 - 2 LSB |
| 01001 | 97.7 - 2$\frac{1}{2}$ LSB |
| 01001 | 88.0 - 2$\frac{1}{4}$ LSB |
| 01011 | 107.5 - 2$\frac{3}{4}$ LSB |
| 01100 | 83.1 - 2$\frac{1}{8}$ LSB |
| 01101 | 102.6 - 2$\frac{5}{8}$ LSB |
| 01110 | 92.9 - 2$\frac{3}{8}$ LSB |
| 01111 | 111.8 - 2$\frac{7}{8}$ LSB |
| 10000 | 39.1 - 1 LSB |
| 10001 | 58.6 - 1$\frac{1}{2}$ LSB |
| 10010 | 48.9 - 1$\frac{1}{4}$ LSB |
| 10011 | 68.4 - 1$\frac{3}{4}$ LSB |
| 10100 | 44.0 - 1$\frac{1}{8}$ LSB |
| 10101 | 63.5 - 1$\frac{5}{8}$ LSB |

-continued

| Counter State | DAC Output (Millivolts) |
|---|---|
| 10110 | 53.8 - 1⅜ LSB |
| 10111 | 72.7 - 1⅞ LSB |
| 11000 | 117.3 - 3 LSB |
| 11001 | 136.8 - 3½ LSB |
| 11010 | 127.1 - 3¼ LSB |
| 11011 | 146.6 - 3¾ LSB |
| 11100 | 122.2 - 3⅛ LSB |
| 11101 | 141.7 - 3⅝ LSB |
| 11110 | 132.0 - 3⅜ LSB |
| 11111 | 150.9 - 3⅞ LSB |

After receiving a reset pulse, counter 30 will be in its initial state (00000). At the end of each repetition period of the continuous analog input signal a clock pulse is generated by clock generator 10. This clock pulse is applied to the clock input of binary counter 30 which will produce the 32 counter states shown in the table above. Each repetition of the input signal produces an individual discrete output from DAC 40. It can be seen from the above table that output of DAC 40 is cycled through 32 dither states each one of which is progressively added to the input signal prior to the 8-bit quantization process performed in waveform digitizer 60.

Operation of the invention may be best understood by referring to the drawing FIGURE while reading the following description. The counter is reset by some external means (not shown) and its output goes to the initial state (00000). The initial repetition of the analog signal is summed with the output of DAC 40, which is zero at this point, and digitized by waveform digitizer 60. This process would, of course, produce a digital output signal based on the resolution and accuracy of the 8-bit quantizer of waveform digitizer 60.

Thus, $[A] \rightarrow [D_0]$ where A is the initial array of analog input values and $D_0$ is the initial array of digital output values. At the end of the first repetition of the analog input signal, a clock pulse is generated by clock generator 10 and applied to binary counter 30. The output of counter 30 increments one to 00001. As shown in the above table, DAC 40 converts this counter output to the analog equivalent of ½ LSB of the system quantizer. This analog value is summed with the input analog signal in summer 50 to produce the array $[A + \frac{1}{2}LSB]$. This array is digitized to produce the digital array $[D_1]$. Arrays $[D_0]$ and $[D_1]$ may be added by suitable means in digitizer 60 to produce a new array $[D_{0+1}]$.

The effect of the above process is to essentially double the resolution of the 8-bit quantizer. It may be shown, by the appropriate mathematical manipulation, that the new array $[D_{0+1}]$ is equal to the digital output produced by a 9-bit quantizer operating on the analog array of $[A + \frac{1}{2}LSB]$. The quantizer now has 512 ($2^9$) rather than 256 ($2^8$) effective quantization levels. Therefore, its resolution has been doubled. If this sequence is performed two more times, the output of the quantizer is equal to the 10-bit quantization of the analog input $(A + \frac{3}{8}LSB)$. Therefore, after a given number ($2^R$) of repetitions, the number of effective quantization levels (Q) is:

$$Q = 2^{(M+R)} \quad (1)$$

where
M = number of bits of the quantizer
R = the exponent of the power of two equal to the number of repetitions For example, in a preferred embodiment the above sequence is repeated eight times to yield:
Repetitions = $2^R$
$8 = 2^R$
R = 3 Thus the number of effective quantization levels is
$Q = 2^{(M+R)}$
$Q = 2^{(8+3)}$
$Q = 2^{11}$ Therefore, the original 8-bit quantizer now has the effective resolution of an 11-bit quantizer. Also the quantization error E has been reduced from ½LSB of an 8-bit quantizer to $$E = \frac{1}{2}(1 - 1/2^R)LSB \quad (2)$$

The present invention also compensates for errors in the location of each of the cut-points in the quantizer. For example, the first cut-point may not occur at exactly +½ LSB or the differences between cut-points may not all be equal or uniformly changing. The present invention offsets the above-described dithering sequence by integer multiples of one LSB. This can be seen in Table 1 wherein after the first 8 repetitions the next 8 repetitions are offset by 2 LSB, the next 8 are offset by 1 LSB and the final 8 repetitions are offset by 3 LSB. Thus, in the preferred embodiment of FIG. 1, the location errors of four adjacent cut-points are weighed together in the combination of the 32 digital arrays generated by the quantizer. Assuming that the cut-point errors are randomly distributed, the rms error will be reduced by a factor equal to the square root of the number of cut-points traversed by the offset signal. Thus in the above example the errors are reduced by a factor of 2.

It may be observed in the foregoing specification that such specification has not been burdened by the inclusion of large amounts of detail and specific information relative to such matters as circuitry, timing, and the like since all such information is well within the skill of the art. It will, therefore, be apparent to those skilled in the art that many changes may be made to the above described preferred embodiment without departing from the present invention in its broader aspects. We intend the appended claims to cover all such changes as fall within the scope of the invention.

We claim as our invention:

1. A system for converting a repetitive analog input signal to an equivalent digital representation, the system including means for generating a dither signal, means for combining the analog signal with the dither signal, and means for quantizing the resultant combined signal to provide a digital representation thereof, characterized in that
    said dither signal generating means generates a repetitive sequence of voltage levels corresponding in magnitude to different fractional and whole multiples of a digital bit produced by said quantizing means, and
    different repetitions of said analog input signal are sequentially combined with the different dither voltage levels of said sequence.

2. The system of claim 1, further characterized in that said dither signal generating means comprises
    means for generating clock pulses at a rate equal to the repetition rate of said analog input signal,
    counter means for counting said clock pulses and providing an n-bit digital signal signifying the number of counted pulses, and means for converting said digital signal to a corresponding analog voltage level.

3. The system of claim 2, further characterized in that said counter means comprises an n-bit binary counter providing $2^n$ different output states, and said converting means provides a different analog output voltage level for each of said states.

4. The system of claim 3, further characterized in that a series of said output states from the binary counter is converted by said converting means to a series of analog voltage levels corresponding to different fractional values of a digital bit produced by said quantizing means.

5. The system of claim 3 further characterized in that certain of said output states from the binary counter are converted by said converting means to analog voltage levels corresponding to different integer values of a digital bit produced by said quantizing means.

6. The system of claim 3, further characterized in that one output state of said binary counter is converted by said converting means to an analog voltage level corresponding to an integer value of a digital bit produced by said quantizing means, and the next succeeding output states of said counter are converted in sequence to analog voltage levels corresponding to said integer value plus one-half, one-quarter, three-quarters, one-eighth, five-eights, three-eights and seven-eights of such a digital bit.

7. In a system for converting a repetitive analog input signal to an equivalent digital representation, which system includes means for generating a dither signal, means for combining the analog signal with the dither signal, and means for quantizing the resultant combined signal, an improved dither signal generator comprising
 means for generating clock pulses at a rate equal to the repetition rate of said analog input signal,
 counter means for counting said clock pulses and providing an n-bit digital output signal indicating the number of counted pulses, and
 digital-to-analog signal converter means for converting said digital output signal to an analog voltage level,
 said converter means producing, in response to successive digital output signals from said counter, a sequence of voltage levels corresponding to different integer and fractional values of a digital bit produced by said quantizing means.

* * * * *